United States Patent
Choi et al.

(10) Patent No.: US 8,912,446 B2
(45) Date of Patent: Dec. 16, 2014

(54) TERMINATION STRUCTURE FOR SUPERCONDUCTING CABLE

(75) Inventors: Chang Youl Choi, Gumi-si (KR); Su Kil Lee, Gumi-si (KR); Choon Dong Kim, Gunpo-si (KR); Hyun Man Jang, Hwaseong-si (KR); Seok Hern Jang, Gunpo-si (KR); Heo Gyung Sung, Busan (KR)

(73) Assignee: LS Cable Ltd., Anyang (KR)

( * ) Notice: Subject to any disclaimer, the term of this patent is extended or adjusted under 35 U.S.C. 154(b) by 346 days.

(21) Appl. No.: 13/346,147

(22) Filed: Jan. 9, 2012

(65) Prior Publication Data

US 2012/0118600 A1    May 17, 2012

Related U.S. Application Data

(63) Continuation of application No. PCT/KR2010/002151, filed on Apr. 10, 2010.

(30) Foreign Application Priority Data

Jul. 10, 2009 (KR) .......................... 10-2009-0063140

(51) Int. Cl.
 *H02G 15/34* (2006.01)
(52) U.S. Cl.
 CPC .............. *H02G 15/34* (2013.01); *Y02E 40/648* (2013.01)
 USPC .......................... 174/84 R; 174/15.4; 174/15.5
(58) Field of Classification Search
 CPC ............. H02G 1/00; H02G 3/00; H02G 5/00; H02G 7/00; H02G 9/00; H02G 11/00; H02G 13/00; H02G 15/00; H02G 15/003; H02G 15/007; H02G 15/013; H02G 15/02; H02G 15/08; H02G 15/20; H02G 15/34
 USPC .... 174/125.1, 28, 36, 21 C, 22 C, 99 R, 99 B
 See application file for complete search history.

(56) References Cited

U.S. PATENT DOCUMENTS

| | | | | |
|---|---|---|---|---|
| 3,652,778 A | * | 3/1972 | Sakai | 174/28 |
| 3,764,726 A | * | 10/1973 | Kohler et al. | 174/15.3 |
| 3,792,220 A | * | 2/1974 | Yoshioka et al. | 200/289 |
| 4,485,266 A | * | 11/1984 | Minati et al. | 174/15.4 |
| 4,730,085 A | * | 3/1988 | Hama et al. | 174/14 R |
| 4,786,761 A | * | 11/1988 | Hama et al. | 174/22 C |
| 6,268,562 B1 | * | 7/2001 | Yokoyama et al. | 174/541 |
| 6,525,265 B1 | | 2/2003 | Leijon et al. | |

(Continued)

FOREIGN PATENT DOCUMENTS

| | | |
|---|---|---|
| JP | 53-132794 A | 11/1978 |
| JP | 10-070828 A | 3/1998 |

(Continued)

*Primary Examiner* — William H Mayo, III
(74) *Attorney, Agent, or Firm* — NSIP Law

(57) ABSTRACT

A termination structure for a superconducting cable is described. The termination structure for a superconducting cable includes a first tube including a conductive rod therein to form a room temperature section, a second tube including a conductive rod therein to form a temperature gradient section, and a spacer provided between the first and second tubes, the spacer including a conductive connector configured to connect the conductive rods inside the first and second tubes to each other. The first and second tubes are joined to be separable from each other.

4 Claims, 3 Drawing Sheets

(56) References Cited

U.S. PATENT DOCUMENTS

| | | | |
|---|---|---|---|
| 7,708,577 B2 * | 5/2010 | Lallouet et al. | 439/190 |
| 2004/0211586 A1 * | 10/2004 | Sinha et al. | 174/125.1 |
| 2008/0119362 A1 * | 5/2008 | Ashibe et al. | 505/211 |

FOREIGN PATENT DOCUMENTS

| | | | |
|---|---|---|---|
| KR | 10-0642538 B1 | 11/2006 | |
| KR | 10-2007-010265 A | 10/2007 | |
| WO | WO 99/54889 A * | 10/1999 | H01B 11/02 |

* cited by examiner

TERMINATION STRUCTURE FOR SUPERCONDUCTING CABLE

CROSS-REFERENCE TO RELATED APPLICATIONS

This application is a continuation application of International Application PCT/KR2010/002151, filed on Apr. 8, 2010, which claims the benefit under 35 U.S.C. §119(a) of Korean Patent Application No. 10-2009-0063140, filed on Jul. 10, 2009, the entire disclosure of which is incorporated herein by reference for all purposes.

BACKGROUND

1. Field

The following description relates to a termination structure for a superconducting cable, and, for example, a termination structure for a superconducting cable for withdrawing a terminal of the superconducting cable from a side at a very low temperature to a side at room temperature.

2. Description of Related Art

As an existing termination structure for a superconducting cable, there is a termination structure disclosed in Korean Patent Publication No. 10-2007-102651. The existing termination structure for a superconducting is described with reference to FIG. 1.

Referring to FIG. 1, the existing termination structure for a superconducting cable includes a terminal of a superconducting cable 100, a bushing 10 which is connected to a superconductor 100a of the cable 100 to provide electrical conduction from a side at a very low temperature to a side at room temperature, a refrigerant container 11 for accommodating the terminal of the cable 100 and the bushing, a vacuum container 12 covering the outer periphery of the refrigerant container 11, and a porcelain tube 104 which protrudes and connects to a room temperature side of the vacuum container 12.

The porcelain tube 104 is filled with an insulating fluid 104a such as an insulating oil or an SF gas.

The refrigerant container 11 includes a liquid nitrogen layer (liquid refrigerant layer 13) and a nitrogen gas layer (gas refrigerant layer 14) on the very low temperature side and on the room temperature side, respectively, and the liquid nitrogen layer and the nitrogen gas layer are provided adjacent to each other. A flange 108 is interposed between the very low temperature side and the room temperature side.

The gap between an inner surface 11a of the refrigerant container 11 and the outer periphery of the bushing 10 is designed so that the nitrogen gas is not pressurized by a pressurizer but maintained in a gas state, and simultaneously, the pressure of the nitrogen gas and the pressure of liquid nitrogen are in equilibrium.

The bushing 10 (diameter 140 mm) includes the superconductor 100a of the superconducting cable 100, a conductor 10a (diameter 40 mm φ which allows electrical conduction, and a solid insulator 10b (thickness 50 mm) for coating the outer periphery of the conductor 10a.

The superconductor 100a and the conductor 10a of the bushing 10 are connected by a joint 100b. The conductor 10a is made of copper having a relatively small electrical resistance in the vicinity of the temperature of liquid nitrogen.

The solid insulator 10b is made of an FRP having an excellent insulating property. In addition, as illustrated in FIG. 1, an upper screening portion 10c made of copper is provided at an upper end (an end portion positioned on the room temperature side) of the bushing 10.

The refrigerant container 11 is made of stainless steel, and is accommodated in the vacuum container 12 also made of stainless steel. A vacuum heat-insulating layer 11b is provided between the vacuum container 12 and the refrigerant container 11. The refrigerant container 11 includes the liquid nitrogen layer 13 and the nitrogen gas layer 14. A refrigerator 15 for refrigerating liquid nitrogen 13a is connected to the liquid nitrogen layer 13.

Before introducing the liquid nitrogen 13a into the refrigerant container 11, a nitrogen gas is charged in order to remove moisture and the like inside the refrigerant container 11. At the time of supplying the liquid nitrogen 13a to the liquid nitrogen layer 13, the nitrogen gas remains in the vicinity of a portion of the refrigerant container 11, specifically, in the vicinity of the flange 108 provided at the boundary between the very low temperature side and the room temperature side. As described above, the portion where the nitrogen gas remains becomes the nitrogen gas layer 14.

After the liquid nitrogen is introduced into the refrigerant container 11 to allow the pressure of the liquid nitrogen in the refrigerant container 11 to be about 0.5 MPa, the refrigerant container 11 is sealed. With such a configuration, a gas state is maintained only with the pressure the nitrogen gas, and the pressure of the nitrogen gas 14a and the pressure of the liquid nitrogen 13a are approximately in equilibrium.

The existing termination structure for a superconducting cable is divided into a room temperature section A, a temperature gradient section B, and a very low temperature section C. Since the conductor 10a included in the bushing 10 is formed integrally in such a structure, separation of the room temperature section A from the temperature gradient section B is impossible.

Accordingly, the existing termination structure only functions as an air termination connection box (connecting an overhead transmission line to an underground transmission line), and in the case where the terminal of the superconducting cable is connected to an external device such as a gas insulated transmission line (GIL) or a gas insulated switchgear (GIS), an additional air termination connection box is needed. Therefore, the structure of an apparatus becomes complex, a large area is needed, and an insulating weakness portion of the apparatus increases.

In addition, sealing members made of insulating materials are provided to seal the sections at the inner boundary portions between the room temperature section A, the temperature gradient section B, and the very low temperature section C. Since this sealing member is the most vulnerable portion, when an insulation failure occurs in the sealing member at one of the boundary portions, there is a problem in that the entire bushing has to be replaced.

SUMMARY

In one general aspect, there is provided a termination structure for a superconducting cable, including a first tube including a conductive rod therein to form a room temperature section, a second tube including a conductive rod therein to form a temperature gradient section, and a spacer provided between the first and second tubes, the spacer comprising a conductive connector configured to connect the conductive rods inside the first and second tubes to each other. The first and second tubes are joined to be separable from each other.

The general aspect of the termination structure for a superconducting cable may further provide that flange portions are provided on outer peripheral surfaces of the first and second tubes, end portions of the spacer are inserted into the flange portions, and the first and second tubes and the spacer are fastened by a fastening member.

The general aspect of the termination structure for a superconducting cable may further provide a hand hole member configured to separate and assemble the conductive rods, the hand hole member being formed on a side surface of the first tube.

Other features and aspects may be apparent from the following detailed description, the drawings, and the claims.

Figure 1:
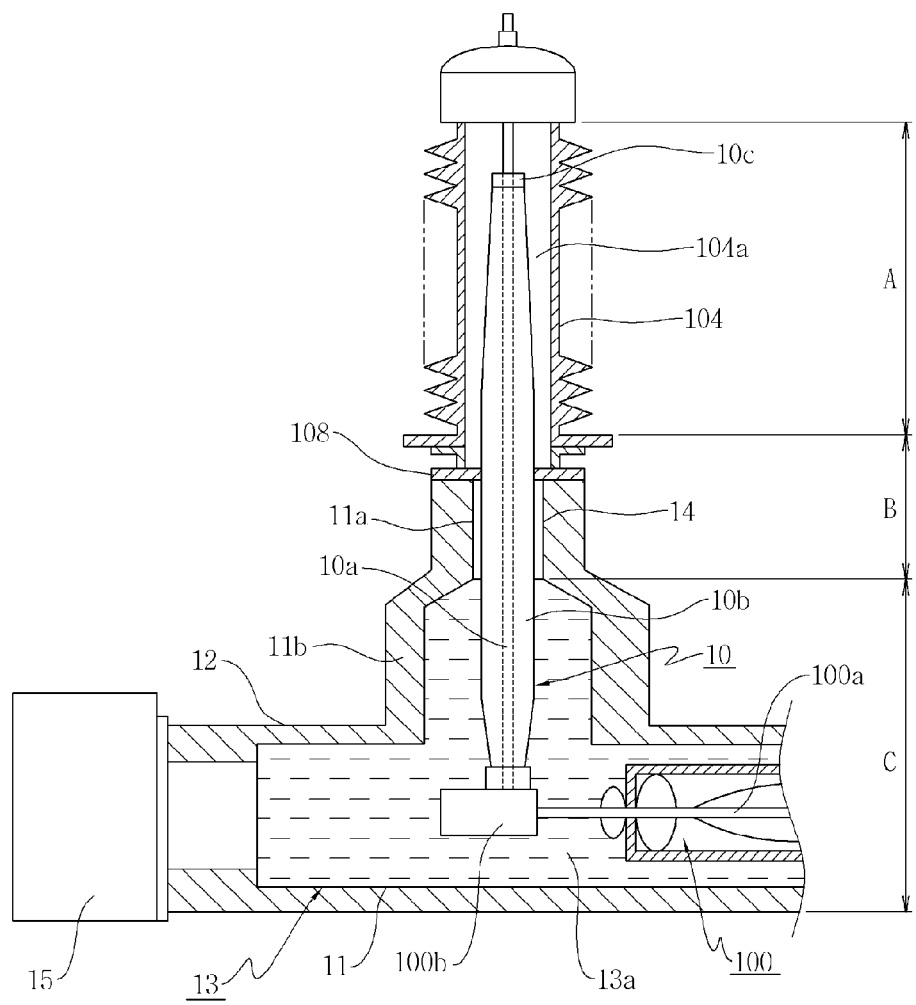
FIG. 1 is a diagram illustrating an example of an existing termination structure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
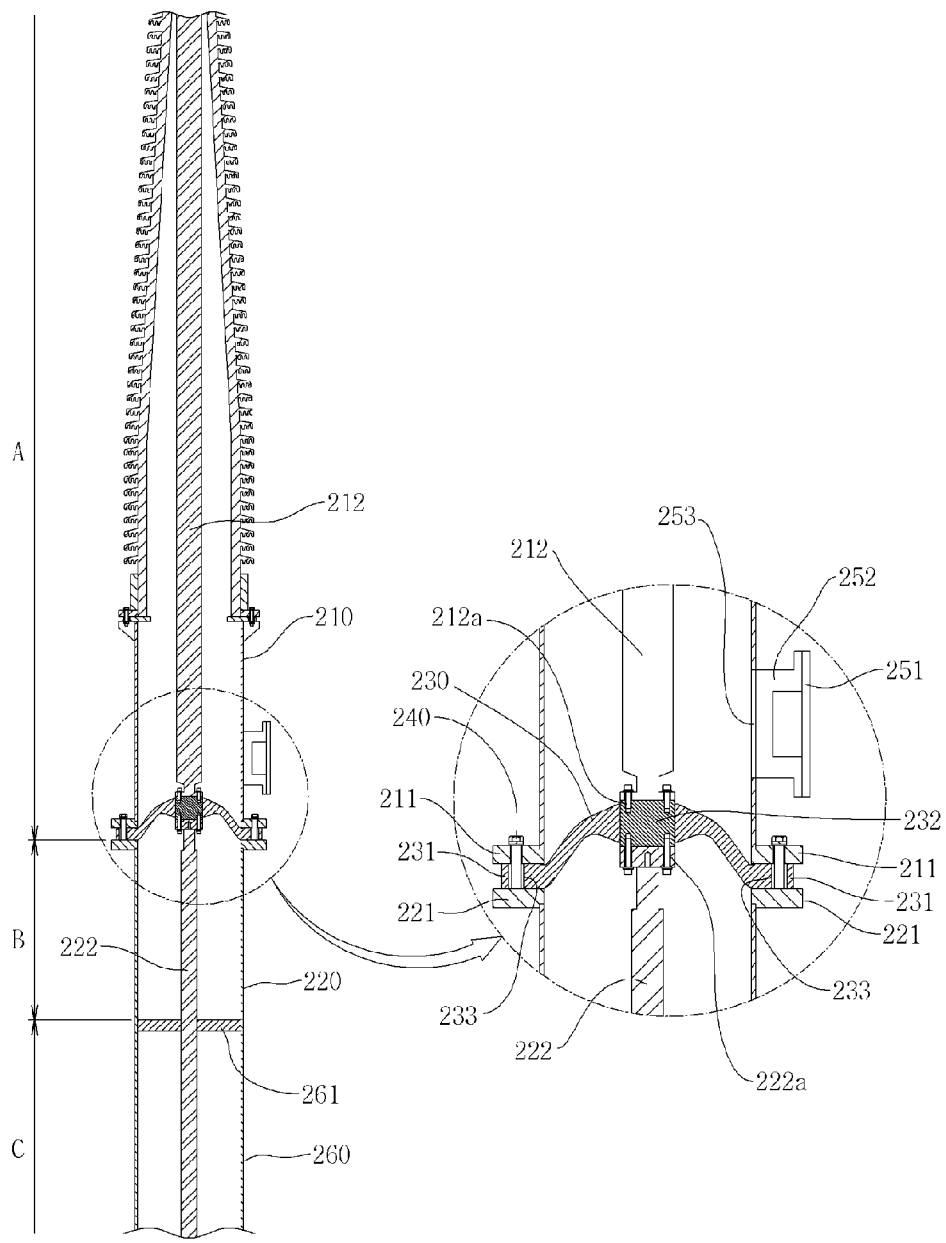
FIG. 2 is a cross-sectional view illustrating an example of a termination structure of a general aspect.

FIG. 2 is a cross-sectional view illustrating an example of a termination structure of a general aspect.

Figure 3:
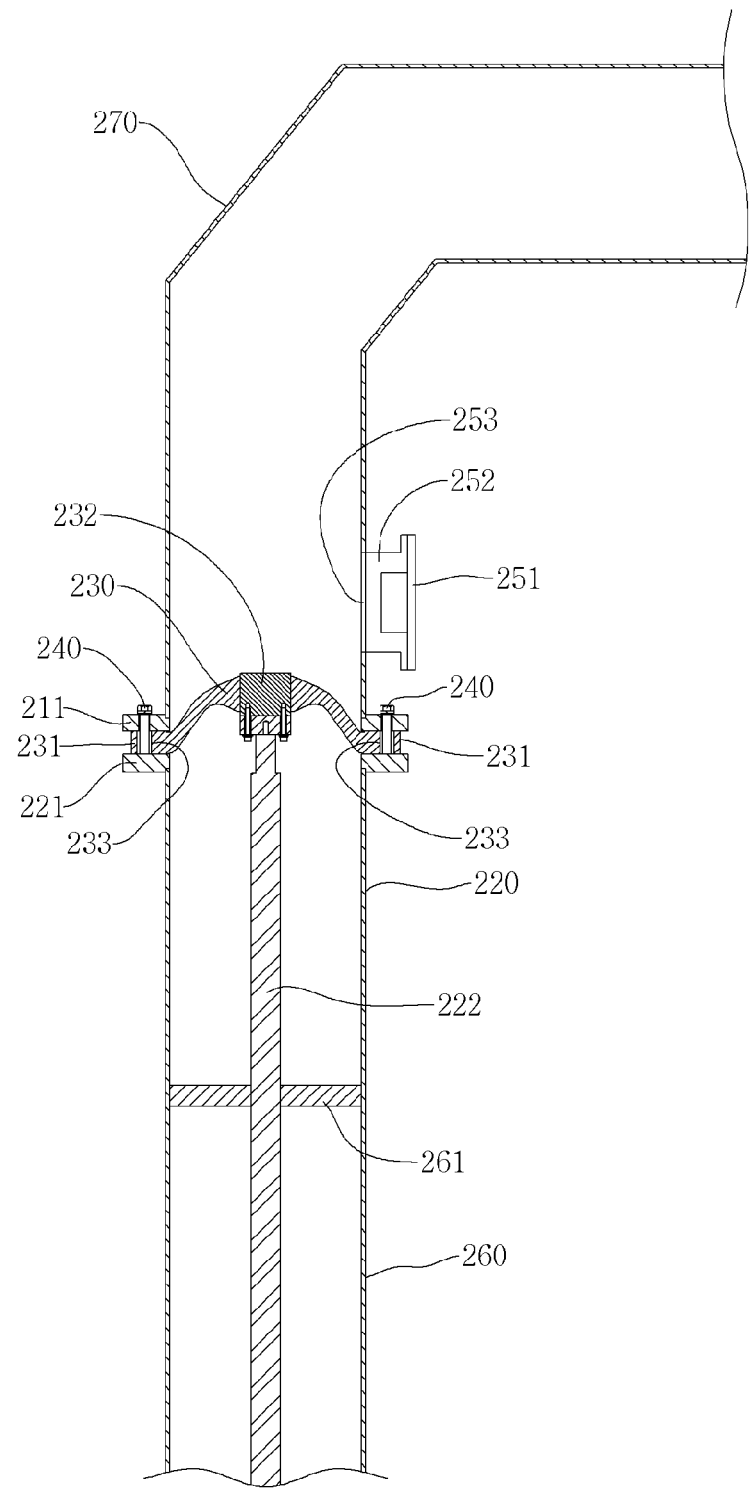
FIG. 3 is a cross-sectional view illustrating an example of a termination structure of a general aspect which is connected to an external device.

FIG. 3 is a cross-sectional view illustrating an example of a termination structure of a general aspect which is connected to an external device.

As illustrated in the figures, the separable termination structure for a superconducting cable is divided into a room temperature section A provided with gas or insulating oil, a temperature gradient section B provided with a gas layer (liquid nitrogen), and a very low temperature section C refrigerated by the liquid nitrogen. The termination structure includes a tube unit 200 configured by first, second, and third tubes 210, 220, and 260, and the first, second and third tubes 210, 220, and 260 of the tube unit 200 form the room temperature section A, the temperature gradient section B, and the very low temperature section C, respectively. The first and the second tubes 210 and 220 are joined to be separable.

Flange portions 211 and 221 are formed on the outer peripheral surfaces of the first and second tubes 210 and 220. A spacer 230 is joined between the first and second tubes 210 and 220 to seal the first and the second tubes 210 and 220. Both end portions of the spacer 230 are inserted between flanges 211 and 221 and are fastened by a fastening member 240 to maintain a fixed state.

The first and second tubes 210 and 220 are blocked by the spacer to maintain a sealed state while they are separable, and with such a configuration, different dielectric materials (oil or gas) are used for the respective sections.

In addition, a conductive connector 232 is provided at the center of the spacer 230 to connect and join a conductive rod 212 inside the first tube 210 corresponding to the room temperature section A to a conductive rod 222 inside the second tube 220 corresponding to the temperature gradient section B. For example, the first, second and third tubes 210, 220 and 260 are made of stainless steel or aluminum.

The end portions of the conductive rods 212 and 222 are fixed to the conductive connector 232 using fastening members 212a and 222a. For example, bolts or screws are used as the fastening members 212a and 222a. However, it will be understood by those skilled in the art that various fastening members may be used.

For example, the spacer 230 is made of epoxy resin, and fastening pieces 233 having threaded holes for fastening are provided in both end portions 231 of the spacer 230. Bolts or screws are used as the fastening member 240, and as the fastening member 240 is fastened by the fastening piece 233, the spacer 230 is fixed to the first and second tubes 210 and 220.

A hand hole member is formed on a side surface of the first tube 210. For example, the hand hole member includes a cover portion 251 and a housing 252, and a through-hole 253 is provided in a portion where the housing 252 and the first tube 210 are in contact with each other. The conductive rods 212 and 222 can be separated and assembled in the tube unit using the hand hole member.

For example, the second and the third tubes 220 and 260 are formed integrally. In addition, a sealing plate 261 is joined at the boundary between the temperature gradient section B and the very low temperature section C, that is, between the second and third tubes 220 and 260. Here, the conductive rod 222 extends to the inside of the third tube 260 corresponding to the very low temperature section C.

The conductive rod 222 provided inside the second tube 220 corresponding to the temperature gradient section B may be coated in order to sufficiently endure thermal stress and to have improved insulating ability. Teflon resin may be used as the coating material. The Teflon resin has advantages in that insulating ability is very excellent and it can endure the thermal stress well, which is caused by a temperature deviation.

For example, as illustrated in FIG. 2, the first and the second tubes 210 and 220 which are in the assembled state are separable from each other. Therefore, as illustrated in FIG. 3, the termination structure may be easily altered to be used through air or gas termination connection by separating the first and second tubes 210 and 220 from each other.

For example, when the first and the second tubes 210 and 220 are to be separated or to be joined, the cover portion 251 of the hand hole member formed on a side surface of the first tube 210 is separated from the housing 252. Then, a worker joins or separates the end portions of the conductive rods 212 and 222 to or from the conductive connector 232 through the through-hole 253. Here, when the conductive rod 212 is separated from the conductive connector 232 to separate the first tube 210 from the second tube 220, for example, an external device such as a gas insulating transmission line 270 can be directly connected to the second tube 220. Accordingly, the termination structure may be conveniently changed for use as an air termination connection box to use as a gas termination connection box.

As described above, in a general aspect, a single termination structure may be conveniently changed between the air termination connection box and the gas termination connection box as needed, so that an independent termination connection box is not needed. Therefore, an economical and compact configuration of the device can be achieved.

In addition, in a general aspect, even in the case where the dielectric breakdown occurs in the spacer 230 provided between the first and second tubes 210 and 220, the first and second tubes 210 and 220 may be easily separated and replaced.

According to teachings above, there is provided a termination structure for a superconducting cable which may be simple, compact, and separable and not require a large area so that a terminal of the superconducting cable can be conveniently connected to an external device through a single termination structure.

According to teachings above, there is provided first and second tubes of the room temperature section and the temperature gradient section of the termination structure that may be separable from each other. If necessary, the first tube may be removed to be conveniently connected to an external device. Therefore, without an additional air or gas termination connection box, a purpose switch between an air termination connection box and a gas termination connection box may be easily achieved using only a single termination structure.

According to teachings above, there is provided a termination structure that may be compact, have an improved sealing effect, and have a minimized insulating weakness portion.

According to teachings above, there is provided a termination structure that may be used in various industrial fields as a termination connection box of a superconducting cable.

A number of examples have been described above. Nevertheless, it will be understood that various modifications may be made. For example, suitable results may be achieved if components in a described system, architecture, device, or circuit are combined in a different manner and/or replaced or supplemented by other components or their equivalents. Accordingly, other implementations are within the scope of the following claims.

What is claimed is:

1. A termination structure for a superconducting cable, comprising:
   a first tube including a conductive rod therein to form a room temperature section; and
   a second tube including a conductive rod therein to form a temperature gradient section;
   wherein the first tube and the second tube are directly joined by a spacer as a seal between the room temperature section and the temperature gradient section,
      the spacer comprises a conductive connector passing therethrough and contacting the conductive rods inside the first and the second tubes for electrical connection therebetween, and
      the first and second tubes are joined to be separable from each other.

2. The termination structure according to claim 1, wherein:
   flange portions are provided on outer peripheral surfaces of the first and second tubes;
   end portions of the spacer are inserted into the flange portions; and
   the first and second tubes and the spacer are fastened by a fastening member.

3. The termination structure according to claim 1, further comprising:
   a hand hole member configured to separate and assemble the conductive rods, the hand hole member being formed on a side surface of the first tube.

4. The termination structure according to claim 2, further comprising:
   a hand hole member configured to separate and assemble the conductive rods, the hand hole member being formed on a side surface of the first tube.

* * * * *